K. Gibbs.
Loom Temple.

N° 1,080. Patented Feb. 13, 1839.

UNITED STATES PATENT OFFICE.

KENDALL GIBBS, OF SOUTH BERWICK, MAINE, ASSIGNOR TO JONA. DENNIS, JR., OF PORTSMOUTH, RHODE ISLAND.

IMPROVEMENT IN SELF-ACTING TEMPLES FOR LOOMS.

Specification forming part of Letters Patent No. 1,080, dated February 13, 1839; antedated November 6, 1838.

*To all whom it may concern:*

Be it known that I, KENDALL GIBBS, of South Berwick, in the county of York and State of Maine, have invented a new and useful Improvement on Self-Adjusting Temples for Power or Hand Looms; and I do hereby declare that the following is a full and exact description.

The nature of my invention consists in constructing the temples with a joint, so that if the shuttle stops between the temple and the reed the temple will be pressed back by the shuttle as the lathe strikes against the cloth, without injury to the shuttle, temple, or reed. This joint also allows the temple to vibrate toward the reed as it opens, and after it shuts, as the lathe leaves it, it vibrates from the reed with a reacting motion, which makes the selvage, or threads at and near the edge, tight to any degree that the operator may require, thereby facilitating the entrance and exit of the shuttle.

To enable others skilled in the art to make and use my invention, I will proceed to describe its construction and operation.

It is represented in the three accompanying drawings, of which No. 1 is a perspective drawing, referred to in this specification by letters. No. 2 is a drawing of a side view, and No. 3 is a drawing of a top view. The two last-named drawings are referred to in this specification by figures, and the parts that are shown in both are marked or referred to in each drawing by the same figure, and the parts that are shown only in one are marked in that drawing only.

Figure 3:
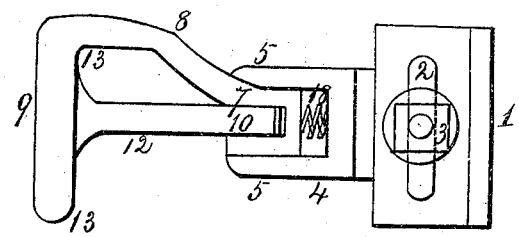
Figure 2:
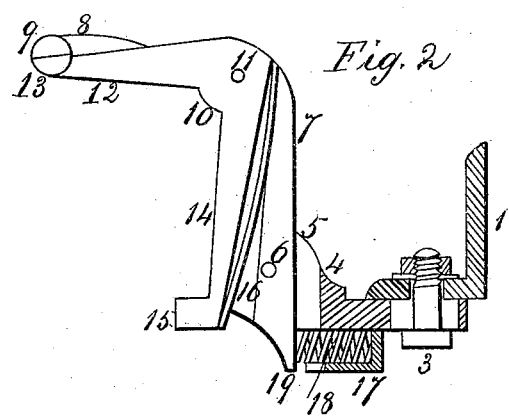
Figure 1:
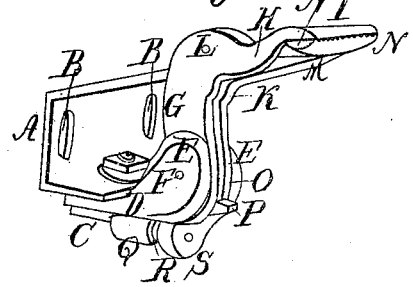

A and 1 (of the accompanying drawings) is a metal stand, one part of which is at right angles to the other. The upright part has two grooves or slots B B for the bolts that fasten it to the breast-beam of the loom, so as to raise or lower it. The lower part of the stand projects out from the breast-beam and has a groove or slot through it lengthwise, (see Fig. 2,) through which the bolt C and 3 passes to hold the slide D and 4, which has a slot in it at right angles to that in the stand, so that the operator can set the temple near or far from the breast-beam in toward the cloth or out from it. The slide D and 4 has two projections upon the end, as E E and 5 5, which have the pin F and 6 passing through them and the lower end of the main part of the temple G and 7, which forms the joint, upon which it vibrates easily. The main part of the temple G and 7 has a crooked arm projecting from it, as at H and 8. This arm has a straight projection from it, as at I and 9, which forms the upper jaw of the temple. The upright portion of the main part G and 7 has a perpendicular groove through its whole length, from one side of which the crooked arm H and 8 projects. There is an angular lever K and 10 fastened in this perpendicular groove by a pin L and 11, upon which it moves easily. The arm M and 12 of this angular lever has a piece across the end N N and 13 13, which forms the lower jaw of the temple. This lower jaw has teeth in it, so as to hold the cloth firmly. The arm O and 14 (which is in the perpendicular groove) has a projection upon the lower end P and 15, against which the head of the screw (that is screwed into the race-board of the lathe of the loom) strikes to open the jaws of the temple when the lathe strikes against the cloth. The jaws are shut by the spring 16, the upper end of which is riveted or dovetailed into the perpendicular groove behind the angular lever K and 10, and the lower end stands out against the arm O and 14 of the lever K and 10 and shuts the temple firmly. In the Drawing No. 2 the side of the main part G and 7 and one side of the slide D and 4 are left off to show the lever K and 10 and the spring 16. The slide D and 4 has a projection on the under side Q and 17, with a hole drilled into it for the spiral spring R and 18, that acts against the lower end S and 19 of the main part G and 10, and presses it out, throwing the jaws from the reed, which draws the selvage or threads at and near the edge, tight. (In Drawing No. 2 a part of the projection Q and 17 is left off to show the spiral spring R and 18.) As the lathe strikes against the cloth the head of the screw in the race-board hits the projection P and 15, which is below the pin F and 6, and as the spiral spring R and 18 is pressed back with less force than the spring 16 behind the lever K and 10 in the perpendicular groove it throws the jaws toward the reed until the part S and 19 presses in the spring R and 18 and stops against the projection Q and 17, when the end of the lever P and 15 is pressed back into the groove and opens the jaws for the cloth to be drawn through. As the lathe leaves the temple it removes the pressure from the projection P and 15, and as the spring that shuts the jaws is stiffer than the other the jaws are shut before the spiral spring R and 18 acts to throw the temple from the reed. After the temple is shut, as the lathe leaves the temple the spiral spring acts and throws the temple from the reed, which draws the selvage or threads at and near the edge of the web tight. The last-named threads being drawn tight makes the harness open the shades of yarn or silk with more certainty and facilitates the entrance and exit of the shuttle, and if the shuttle stops between the temple and the reed as the lathe strikes up against the cloth, the shuttle strikes the jaws of the temple, and as the temple is hung upon a joint, of which the pin F and 6 is the fulcrum, the shuttle, striking against the jaws of the temple, presses or throws them back toward the breast-beam without injury to the shuttle, temple, or reed.

What I do claim as my invention, and desire to secure by Letters Patent, is—

1. The joint that allows the jaws of the temple to vibrate toward the reed before they open and from the reed after they are shut, and further allows the temple to be pressed back by the shuttle when it stops between the temple and the reed without injury to the shuttle, temple, or reed.

2. Making the projection upon the lever that opens the temple on the opposite side of the fulcrum or joint from the jaws, so that the jaws are thrown toward the reed before they open and from the reed after they are shut.

3. Making the spring that shuts the temple stiffer than the one that throws the jaws of the temple from the reed, so that the jaws are thrown toward the reed before they open and from the reed after they are shut to draw the selvage or threads at and near the edge tight, the whole being constructed and operating as herein described.

KENDALL GIBBS.

Witnesses:
E. F. NEALLEY,
GEO. R. PIERCE,
JOHN B. NEALLEY.